March 22, 1938. C. B. HOWARD 2,111,931
VEHICLE DIRECTION INDICATOR
Filed April 14, 1937
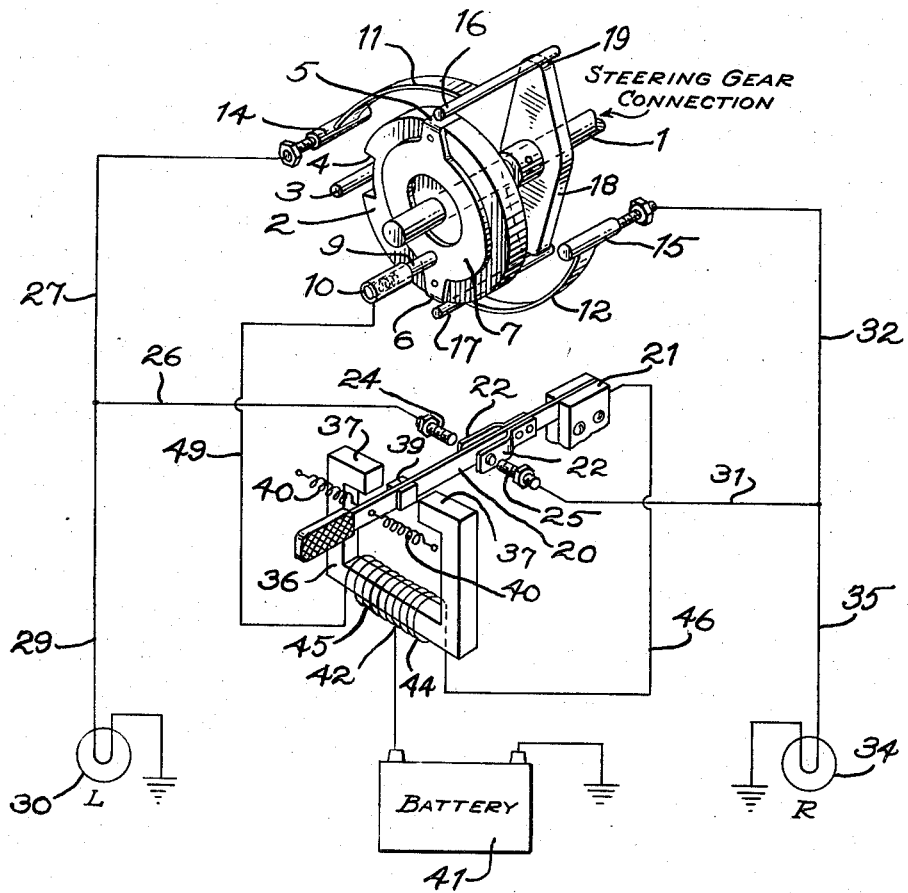
INVENTOR.
CLARENCE B. HOWARD
BY
Lippincott & Metcalf
ATTORNEYS.

Patented Mar. 22, 1938

2,111,931

UNITED STATES PATENT OFFICE 2,111,931

VEHICLE DIRECTION INDICATOR

Clarence B. Howard, Oakland, Calif., assignor to E. H. Kueffer

Application April 14, 1937, Serial No. 136,709

5 Claims. (Cl. 177—339)

My invention relates to vehicle direction indicators, and more particularly to a system adapted for use on a vehicle so that a change in direction will be automatically indicated at all times, and indicated manually when desired.

Among the objects of my invention are: To provide an automatic and manual direction indicator for vehicles; to provide a direction indicator for vehicles which may be preset to indicate a predetermined direction and which will automatically, thereafter, indicate the direction in which the actual turn is made, irrespective of the setting of the manual device; to provide a manual direction indicator which may be operated to indicate a predetermined direction, and which is automatically tripped when the vehicle changes direction, either in accordance with the predetermined direction or the opposite direction; to provide a directional indicating device operating both manually and automatically; and to provide a direction indicating device operating manually and automatically, which will show direction when a turn is made, irrespective of presetting.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The present invention is a continuation in part of my prior application entitled "Vehicle signaling system," Serial No. 135,921, filed April 9, 1937, and utilizes, in a preferred embodiment, the general principles of the switch described and claimed in my prior application entitled "Vehicle signal switch", Serial No. 124,863, filed February 9, 1937, In my application for a "Vehicle signaling system", supra, I have described a directional indicating device for installation on a vehicle, so that a signal lamp may be lit to indicate when the operator desires to turn either right or left. When that turn is actually made an automatic switch, connected to the steering gear, maintains the signal light and at the same time returns the manual control to a neutral position, ready for the next setting at the will of the operator. However, the disadvantage inherent in that system lies in the fact that if an emergency should occur after the signal lamp for one direction is lit, and the turn should unexpectedly be made in the opposite direction, both right and left indicator lamps would light, and not until the turn was reversed would the manual device trip and allow only the proper lamp to be lit.

The present circuit embodies a manual switch that will return to neutral, irrespective of which way the vehicle actually turns, and thus in an emergency there cannot be, at any time, an illumination of both right and left indicator lamps. Therefore, a following car is instantly aware of the turn about to be made, immediately the turn starts.

My invention may be more fully understood by direct reference to the drawing, wherein the single figure shows a preferred form of single disc switch operating in conjunction with a manual switch having an automatic release. Both the automatic switch and the manual switch are shown diagrammatically and in perspective, essential parts only being illustrated.

I prefer to utilize an automatic switch assembly comprising a switch axle 1 connected to the steering gear in any convenient manner, so that the axle 1 is rotated as the steering gear is rotated to change the direction of a vehicle. For the purposes of the present invention it is immaterial just how this connection is made, although I prefer to attach the switch axle to the quadrant arm axle when the device is attached to an automobile.

Mounted on axle 1 is a movable contact disc 2, this disc having only a frictional engagement with the axle 1. This frictional engagement may be made in a number of manners, for example, such as being a tight fit on the axle, or there may be a friction clutch provided between the axle and the disc. Irrespective of how the disc 2 is frictionally rotated, it is limited in its rotational arc by a stop pin 3 inserted in a notch 4. It is obvious, however, that various equivalent expedients may be utilized to limit the rotation of the disc, and these equivalents will be readily apparent to those skilled in the art. It is also obvious that when I speak of "disc" in the present application, I am referring to the member 2 as needing a circular periphery only at those points where brushes contact this periphery, and that while it is convenient to shape the member as a whole in the form of a disc, those portions of the member which do not involve the use of the periphery thereof may be cut away.

Mounted on movable contact disc 2 are two opposed peripheral contacts 5 and 6. These contacts are joined by a ring connecter 7, cut away in the center so that no electrical connection is made to the axle 1. I prefer to make the contacts 5 and 6 integral with the link 7, and the entire piece may thus be readily made as a metal stamping. Circular link 7 is utilized as a bearing surface for a take-off brush 9 operating in a brush casing 10, the latter containing the usual spring to force the brush against the ring. Thus, during rotation of the disc 2 through its limited arc, contact is made by the brush with link 7, and therefore to peripheral contacts 5 and 6. It is obvious that as only a small movement is made, a pigtail connection could be used.

Bearing against the periphery of disc 2 adjacent the contacts 5 and 6 are two brushes 11 and 12, respectively, supported by connecter pins 14 and 15. The latter may be conveniently supported by a case, or end plate for the switch, not shown. On the free end of each brush I provide brush contacts 16 and 17, and these brush contacts are so positioned with relation to movable contacts 5 and 6, that when the disc 2 is rotated to the limit of its travel in either direction, as determined by stop pin 3 in notch 4, one or the other only of the contacts 16 or 17 connects with the moving contact 5 or 6. Thus, when the axle 1 is rotated in one direction, one circuit will be made between brush 9 and, let us say, connecter pin 14; whereas, when the rotation of the shaft 1 is changed, then the disc will rotate in the opposite direction until stopped by stop pin 3, and connection will be made from brush 9 to connecter pin 15. Thus, as explained in my prior applications above referred to, the switch will indicate any change in direction of rotation of shaft 1 by selectively closing two circuits.

Inasmuch as in steering an automobile directly ahead it is not desirable to have any indicator lamps illuminated, and inasmuch as in an intermediate position between the circuits just above described both lamps might be illuminated, I have provided a means for lifting both of the brushes 11 and 12 out of contact with the periphery of the disc when the vehicle is proceeding straight ahead. One means for accomplishing this purpose is to prolong the brush contacts 16 and 17 to one side of the disc, and to provide on shaft 1 a cam 18 which, when revolved, will engage the ends of brush contacts 16 and 17 and raise them out of contact with the periphery of the disc. The cam lifting arc 19 on the periphery of the cam may be made as wide as desired to accommodate the normal deviation from the straight ahead direction which would occur while traveling without definitely desiring to make a turn sufficiently wide to cause a following vehicle to be in danger.

This completes the description of the automatic switch, and I will next proceed to the description of the manual switch, which is preferably located on the dash of the automobile.

In this device a manual switch arm 20 is pivoted to a contact block 21, and is provided with two lateral contacts 22. Opposite each of these lateral contacts are a right indicator contact 25 and a left indicator contact 24. Left indicator contact 24 is connected through wire 26 to wire 27 coming from one brush 11 on the automatic switch, thence proceeds through wire 29 to left indicator lamp 30, and thence to ground. Right indicator contact 25 is connected through wire 31 to wire 32 coming from brush 12 on the automatic switch, thence proceeds to right indicator lamp 34 through wire 35, and thence to ground.

The indicator arm 20 may be preset manually and is maintained in set condition by means of a holding magnet 36 having opposed pole pieces 37 adjacent armature 39 mounted on manual indicator arm 20. Centering springs 40 on the indicator arm tend to maintain the arm in neutral position and free of both contacts 24 and 25. The usual power source, such as battery 41, is provided, the negative pole of which is usually grounded and the positive pole of which leads to an intermediate tap 42 on a coil wound around holding magnet 36. This coil is divided into two sections, a holding section 44 and a bucking section 45. The end of the holding section is connected through wire 46 to contact block 21, and thence to arm 20. The end of the bucking section is connected through wire 49 to the brush holder 10 of the automatic switch.

While I have shown no disconnect switch in the power line, it is convenient to energize the bucking and holding coils from the battery through the ignition switch (not shown), so that the indicator lamps cannot be left in operation when the car is not in use.

The operation of the device is as follows: If it is desired to turn left at any time, the manual indication of this desire is set up by moving the switch arm 20 to the left, thus energizing the left indicator lamp 30 by closing contacts 22 and 24 of the manual switch and allowing power from the battery to flow through the lamp 30, through the holding coil 44. Magnetism developed will cause the arm 20 to be maintained in the left position.

When the car is proceeding straight ahead no contacts are made by the automatic switch, due to the action of the cam 18. When, however, a turn to the left is made, contact is made through the automatic switch and the left indicator lamp 30 remains lit, but the power for the automatic switch has to pass through the bucking coil 45 which neutralizes the holding magnetism created by holding coil 44, and the springs 40 return the arm to neutral, although there is no flicker or other change in the illumination of the left indicator lamp 30. The same conditions occur when it is desired to set up for a right turn, and a right turn is made.

However, there is one very dangerous condition which might occur in using a manual setup. It may be that the manual switch is set up to indicate a left turn, and then an emergency might arise which would require too swift action by the operator of the vehicle for him to take time to change the manual indication, in case he suddenly decides to turn right instead of left, as he has indicated manually. If he does turn right, however, the right lamp 34 will immediately be illuminated because of the action of the automatic switch, and inasmuch as the power to illuminate the right indicator lamp 34 also has to pass through the bucking coil 45, the magnet 36 will lose its magnetism, the arm will return to neutral position, and the left lamp will go out.

Thus, with the system as above described the manual switch arm returns to neutral, irrespective of which turn is made after any predetermined setup, and there can never be a condition where both left and right indicator lamps are illuminated simultaneously.

I claim:

1. In combination with a vehicle having a steering gear, a signalling system comprising a pair of indicator circuits, a steering gear switch having an element frictionally moved by said steering gear, said element, when moved, selectively and automatically energizing said indicator circuits from a power source in accordance with any substantial change in direction of rotation of said steering gear, to cause a vehicle turn irrespective of amount of rotation of said steering gear, an operating arm, contact means closed by manual movement of said arm to a position selectively energizing one of said circuits, means for holding said arm in the selected position, means for releasing said arm by current flowing from said source when either of said indicator circuits is automatically energized by said switch upon any reversal of the direction of rotation of said steering gear, and means for deenergizing said indicator circuits when the manual contact means is in the open position and the vehicle is proceeding along a substantially straight-away path.

2. In combination with a vehicle having a steering gear, a pair of indicator circuits including a power source, a shaft driven in synchronism with said steering gear, a contact disc mounted on said shaft frictionally rotated thereby and having a pair of peripheral contacts thereon, means for limiting the arc of rotation of said disc, a pair of stationary contacts positioned to selectively engage one of said first mentioned contacts in accordance with the position of said disc at the ends of its rotational arc, means for making continuous contact with both of said first mentioned contacts, a connection from each of said peripheral contacts to one of said indicator circuits, means for breaking said connections over a predetermined arc of rotation of said shaft, an operating arm, contact means closed by manual movement of said arm to a position selectively energizing one of said circuits, means for holding said arm in the selected position, and means for releasing said arm by current flowing from said source when either of said indicator circuits is automatically energized by said switch upon any reversal of the direction of rotation of said steering gear.

3. In combination with a vehicle having a steering gear, a pair of indicator circuits including a power source, a shaft rotated in synchronism with said steering gear, a contact disc mounted on said shaft frictionally rotated thereby and having a pair of peripheral contacts thereon, means for limiting the arc of rotation of said disc, a pair of stationary contacts positioned to selectively engage one of said first mentioned contacts in accordance with the position of said disc at the ends of its rotational arc, means for making continuous contact with both of said first mentioned contacts, a connection from each of said peripheral contacts to one of said indicator circuits, means for breaking said connections during a predetermined arc of rotation of said shaft, means for manually and independently closing either one of said indicator circuits, means for holding said manual means in contact making position, and means operated by current flowing by virtue of engagement of said contacts by motion of said steering gear for releasing said manual means from holding position.

4. A vehicle signalling system comprising a movable contact frictionally moved by movement of the steering mechanism of said vehicle, means for limiting the movement of said movable contact to a predetermined path irrespective of continued movement of said steering mechanism, a stationary contact positioned to be engaged by said movable contact at each end of said path, a pair of indicator circuits including a power source, each connected to one of said stationary contacts, means for completing the indicator circuits through said movable contact, means for making said stationary contacts inoperative when the vehicle steering mechanism is set in the straight-ahead position, manual means movable to selectively energize either of said indicator circuits, means for maintaining said manual means in the selected energizing position, and means operated by current flowing by virtue of engagement of said movable contact with either of said stationary contacts for releasing said manual means from either energizing position.

5. A vehicle signalling system comprising a pair of indicator circuits each including a signal device, a power source, a manually operated switch movable to selectively energize either of said circuits from said power source, means for holding said switch in the selected energizing position, an automatic switch having means adapted to operate in accordance with any change in direction of rotation of the steering gear to energize either of said circuits to indicate said change in direction, means for releasing said manually operated switch from energizing position when either circuit is energized by said automatic switch, and means for cutting off all power to the automatic switch when said steering gear is in a straight ahead position.

CLARENCE B. HOWARD.